United States Patent [19]

Cielker

[11] Patent Number: 4,819,911

[45] Date of Patent: Apr. 11, 1989

[54] CLAMP FOR GRIPPING A FLEXIBLE MEMBER

[76] Inventor: Werner Cielker, Emil-Hoffman-Strasse 9, D-5000 Koln 50, Fed. Rep. of Germany

[21] Appl. No.: 129,612

[22] Filed: Dec. 3, 1987

[30] Foreign Application Priority Data

Apr. 1, 1987 [DE] Fed. Rep. of Germany ....... 3710922

[51] Int. Cl.[4] .............................................. B65M 59/00
[52] U.S. Cl. .......................................... 254/134.3 FT
[58] Field of Search ................ 81/406, 407, 426, 341, 81/427, 427.5; 254/134.3 FT, 134.3 R; 140/123, 123.5

[56] References Cited

U.S. PATENT DOCUMENTS

| | | | |
|---|---|---|---|
| 660,762 | 10/1900 | Thompson | 81/427 |
| 768,974 | 8/1904 | Beaudette | 254/134.3 R |
| 777,021 | 12/1904 | Hansen . | |
| 1,219,160 | 3/1917 | Rosenblatt | 81/341 |
| 1,844,433 | 2/1932 | Markowitz | 254/139.3 FT |
| 2,356,318 | 8/1944 | Hayman | 269/281 |
| 2,613,257 | 10/1952 | Wollet | 254/134.3 R |
| 2,951,259 | 9/1960 | Brockner | 81/427.5 |
| 3,302,929 | 2/1967 | Danielson et al. | 254/134.3 R |
| 3,763,722 | 10/1973 | Ehrens | 81/406 |

FOREIGN PATENT DOCUMENTS

3234898 9/1982 Fed. Rep. of Germany .
2386168 3/1978 France ............... 254/134.3 FT
79/00511 8/1979 PCT Int'l Appl. .

Primary Examiner—Robert C. Watson
Attorney, Agent, or Firm—Diller, Ramik & Wight

[57] ABSTRACT

A clamp for gripping a flexible member, such as flexible bars for pulling cables into cable-protective conduits, the clamp including a clamp body having a generally elongated longitudinal groove of a generally U-shaped cross-sectional configuration adapted to receive therein a portion of a flexible member, a handle, the handle and clamp body having respective opposite first and second end portions with the first end portions thereof being pivotally connected to each other to effect the relative movement of the second end portions between respective first adjacent and second remote relative positions, the handle having an elongated narrow strip in opposed aligned relationship to and sized generally to mate with the longitudinal groove when the second of the handle and clamp body end portions are pivoted from the first adjacent position to the second remote position to thereby clamp the flexible member therebetween, the elongated strip having a convex portion adjacent the handle first end portion and opposing an acute-angled surface of the longitudinal groove, a spring for biasing the handle to the second position, and an abutment surface for limiting pivotal movement of the handle to the second position.

10 Claims, 2 Drawing Sheets

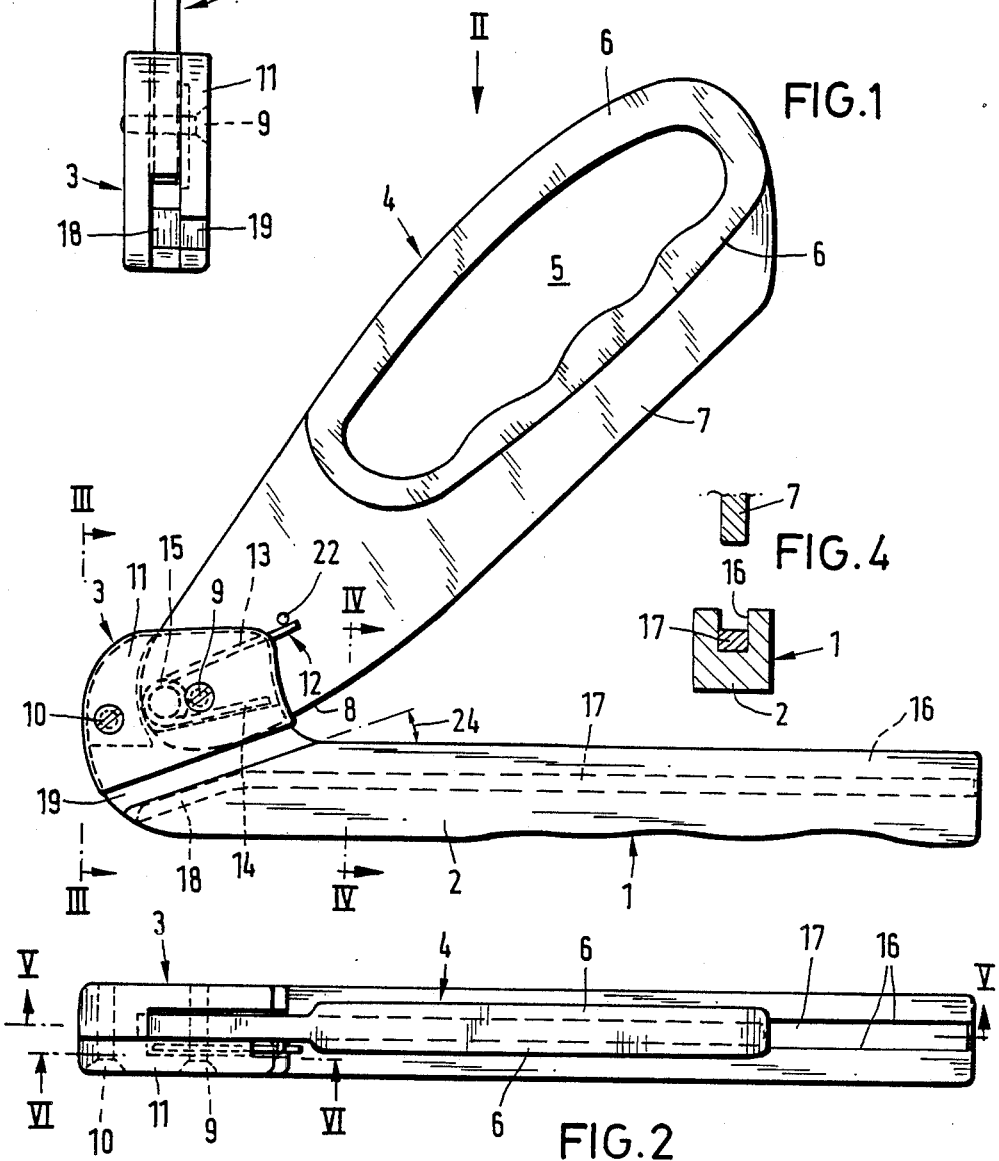

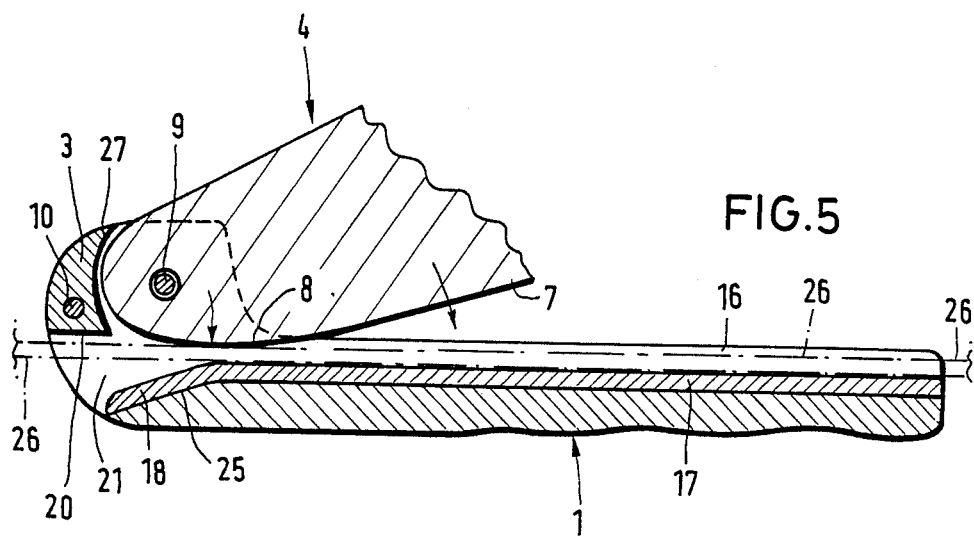
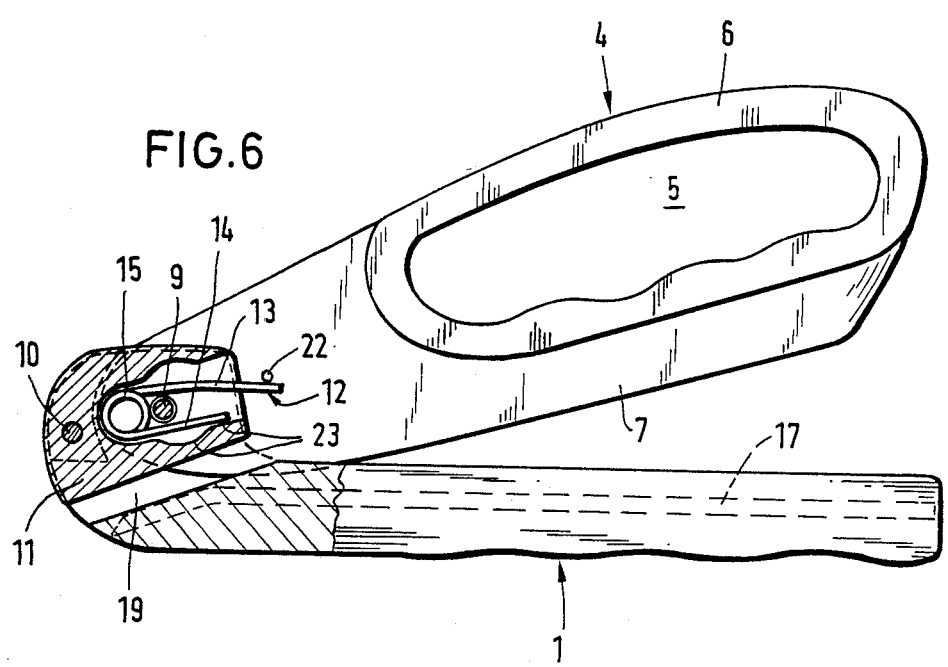

CLAMP FOR GRIPPING A FLEXIBLE MEMBER

BACKGROUND OF THE INVENTION

This invention is directed to a clamp for gripping and displacing flexible members generally made of filamentary material, such as flexible cables, bars or "snakes" which are used to pull cables into cable-protective conduits.

The clamp of this invention includes a clamp body having a longitudinal elongated groove of a generally U-shaped transverse cross-sectional configuration within which is at least partially received the flexible member. The handle is pivotally connected to the clamp body and can be moved to a position in which a portion of the flexible member is clamped between the handle and the clamp body.

In the particular technical field to which the present invention is directed it is necessary to pull cables of electrical wires into cable-protective conduits or sheaths. Cables or wires which are defective must also be removed from cable-protective sheaths and exchanged by new wires or cables, and such new wires or cables are pulled into the cable-protective conduits. The cable-protective conduits are necessarily empty but may have additional wires therein, and the presence of such additional wires at times makes it difficult to pull new wires into the cable-protective conduits. Furthermore, since the cable-protective conduits or pipes are, as a rule, accessible only at a few places along the length thereof, for instance at switch or junction boxes and at outlets, the substantial distances over which the wires and cables must be pulled tends to create inherent failures as efforts are made at pulling the cables and wires into/through the cable-protective conduits. Most times it is necessary to utilize accessory devices to avoid such failures, as, for example, the utilization of flexible members, bars or snakes which on the one hand can adapt to any curvature to the in-place protective conduits but which on the other hand possess enough compressive strength and resistance to kinking that they can be inserted over sufficient lengths by compressive forces (pushing) up to distances of 25 meters into the cable-protective conduits. Once the flexible member/bar has been so inserted, the cable/wire which is to be pulled through the cable-protective conduit is connected to the flexible member and when the latter is pulled back, the electrical cable or wire is then drawn into the cable-protective conduit. Accordingly, it is necessary to provide a clamp which can grip the flexible member or bar as it is pushed into and through the cable-protective conduit and which can also then be pulled back through the cable-protective conduit after electrical wires/cables have been attached thereto.

From a practical standpoint it is extremely laborious to manually push and pull such flexible bars, cables or "snakes" particularly when they are comparatively slender and must be inserted over considerable lengths (25 meters and more) into and through cable-protective conduits and, of course, thereafter withdrawn in the opposite direction together with the electrical wires or cables attached therethrough. Such flexible members readily slip if manually grasped and it is virtually impossible to apply high displacement forces thereto. It has become the tendency for craftsman to wrap these flexible bars, members or "snakes" around one's wrist, elbow or underarm several times (or in other similar manners) attempt to increase one's grip thereof. Aside from the danger of injury to the craftsman/operator, there is also the further risk of excessively bending or kinking the flexible bar or "snake" or otherwise damaging the same causing loss of its compressability and its resistance to kinking.

A conventional clamp is disclosed in French Pat. No. 23 86 168 in which the pulling of electrical cables is facilitated. In this known design the clamp includes a clamp body having one jaw and a longitudinal slot, a handle and a lever arm, and the lever arm carries a second clamping jaw which is appropriately operated to clamp an electrical cable between the two jaws when the handle is pulled. This clamp permits the cable to be moved in only one direction, namely, in the pulling direction of the handle because when the handle is moved in an opposite direction, the lever system separates two clamped jaws. Furthermore, because the described levers and articulated connections are accessible from the exterior, these create a practical area of danger/injury to the operator. Furthermore, the compression applied by the two jaws depends on the traction exerted on the handle and the applied traction does not coincide with the direction of pull of the cable clamped therebetween. Accordingly, because of this off-set there is in actual operation a stepwise pull of the electrical cable which causes it to be undesirably and easily kinked.

Another conventional clamp is disclosed in German Pat. No. 34 16 652 which had a longitudinal slot open on one side within which a flexible member can be inserted. A clamping strip is located inside a clamping body of the clamp and can be displaced toward the longitudinal slot to clamp the flexible member therein. In this case the clamp body consists of two mutually connected plates between which there is located the clamping strip which in a central region thereof remote from the slot includes a cam against which rests a lever pivoted between associated plates. The free end of this lever rests against the inside of a pivoted handle which when actuated causes the lever to press against the cam of the clamping strip to move the latter into its clamping position. This clamp is quite practical, although the practicality depends upon it being constantly used to justify the comparatively high manufacturing costs thereof.

SUMMARY OF THE INVENTION

In view of the foregoing, the present invention is directed to a novel clamp which is relatively inexpensive to manufacture, transmits more accurately the totality of tension or compression forces applied to the flexible member or "snake", and is so constructed as to virtually avoid kinking or damage of the flexible member.

The latter objects are solved by the novel clamp of the present invention by providing a relatively elongated longitudinal groove in a clamping body in which the flexible member or snake is received and a handle pivoted to the clamping body which has a narrow strip lined relative to and introduced at least partially into the longitudinal groove to create high clamping forces without kinking or otherwise adversely effecting the clamped portion of the flexible member.

The novel clamp of this invention further includes a convex surface on the handle which uniquely opposes an angulated portion of the longitudinal groove to assure high localized clamping forces even under minimal manual forces applied between the pivoted handle and the clamping body thereby assuring excellent gripping of the flexible member under virtually all conditions of use.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a side elevational view of a novel clamp constructed in accordance with this invention, and illustrates a handle pivoted to a clamp body, the latter including a longitudal groove, and the handle and clamp body being in their relative nonclamping or best position.

FIG. 2 is a top plan view looking along the arrow II of FIG. 1, and illustrates the manner in which the end of the handle is pivoted between an assembly plate and end of the clamping body.

FIG. 3 is a fragmentary front view looking along line III—III of FIG. 1, illustrates details of the pivotal connection between the handle and the clamp body.

FIG. 4 is a fragmentary sectional view taken generally along line IV—IV of FIG. 1, and illustrates a narrow strip of the handle aligned with the longitudinal groove in which is seated a resilient pad of relatively hard material, such as rubber.

FIG. 5 is a fragmentary sectional view taken generally along line V—V of FIG. 2, and illustrates the handle in its clamped position with an arcuate surface thereof gripping the flexible member adjacent an angulated portion of the longitudinal groove.

FIG. 6 is a side elevational view, partially in fragmentary cross-section, and illustrates the clamped position of the handle and clamp body, along with a return spring for urging the handle to the unclamped position of FIG. 1.

DESCRIPTION OF THE PREFERRED EMBODIMENTS

A novel clamp constructed in accordance with this invention includes a clamp or clamping body 1 consisting of an elongated grip 2 having a relatively wider head or first end portion 3. An elongated longitudinal groove 16 is formed in the clamp body and is of a generally upwardly opening abrupt or rectangular U-shaped cross-sectional configuration, as is best illustrated in FIG. 4.

A handle 4 is secured at a first end portion (unnumbered) thereof to the first end portion 3 of the clamp body 1 by a screw 9 (FIGS. 1, 5 and 6) which also functions as the pivot for effecting relative movement of the handle 4 and the clamp body 1 between the clamped position (FIG. 6) and the unclamped position (FIG. 1) thereof. The length of the handle 4 essentially corresponds to the length of the clamp body 1 and particularly to an elongated grip portion 2 thereof. The handle 4 also includes a lower longitudinal strip 7 which is narrower than the handle 4, particularly opposite bulges or beads 6 thereof surrounding a handle hole or aperture 5. The longitudinal strip 7 has a thickness matching the width of the longitudinal groove 16 and is aligned therewith. The strip 7 at least partially enters the longitudinal groove 16 when the handle 4 descends from the position shown in FIG. 1 to the clamping position shown in FIG. 6.

Preferably the strip 7 includes an arcuate or convex portion 8 (FIG. 1) adjacent the screw or pivot 9 of the handle 4, and the purpose of the convex portion 8 is to apply the clamping force to a portion (unnumbered) of the filamentary material, member, bar, cable or "snake" 26 lying within the groove 16 and projecting beyond both ends thereof, as is best illustrated in FIG. 5. The extent to which the strip 7 enters the groove 16 and compressively clamps the flexible member 26 depends on the one hand upon the pressure generated manually between the pivoting handle 4 and the elongated grip 2 of the clamp body 1, and on the other hand upon the thickness or diameter of the flexible member 26. However, it is enough as a general rule to clamp the flexible member 26 adequately during displacement by moving the handle 4 such that the arcuate or curved portion 8 of the strip 7 alone rests against and applies clamping force to the flexible member 26, again as shown in FIG. 6. In this manner, relative small motion between the handle 4 and the clamp body 1 will effect rapid clamping and unclamping and desired pushing and/or pulling of the flexible member 26.

Preferably a flexible pad of material having a high coefficient of friction, such as hard rubber, is inserted within the groove 16 and covers the entire length thereof, as is best illustrated in FIGS. 4 and 5 of the drawings. The pad 17 thereby increases resistance to slippage and assures that the flexible member 26 is clamped securely and, thus, handled safely during a pushing or pulling operation.

The handle 4 returns from its clamped position (FIG. 6) to its unclamped position (FIG. 1) in an automatic fashion by means of a spring 12 which is mounted between an assembly plate 11 and an end portion (unnumbered) of the handle 4 sandwiched between the assembly plate 11 and the widened or first end portion 3 (FIG. 2) of the clamp body 1. The assembly plate 11 is fixed to the head 3 by the screw 9 and another screw 10. However, before being assembled as shown in the drawings, the spring 12 is seated within a recess (unnumbered but illustrated in FIG. 6) of the assembly plate 11. A coil 15 turned through approximately 540 degrees is seated within the blind end portion (unnumbered) of the recess of the assembly plate 11 and a pair of legs 13, 14 project to the right, as viewed in FIGS. 1 and 6. The spring leg 13 rests against abutment means in the form of a stop pin 22 carried by the handle 4, whereas the spring leg 14 bears against an abutment surface 23. The spring 12 is, of course, a torsion spring and because of the abutment means 22, 23 the handle 14 is normally urged by the torsion spring 12 to its open position (FIG. 1), as is readily apparent from both FIGS. 1 and 6. Obviously, the purpose of the spring 12 is not only to open the handle 14 but to do so rapidly and permit the clamp to be used in a more efficient manner when pushing or pulling the flexible member 26.

In further accordance with this invention the elongated longitudinal groove 16 also includes a portion adjacent the head or first end portion 3 of the clamp body 1 which is in a plane defining an acute angle 24 (FIG. 1) with the major portion (unnumbered) of the longitudinal groove 16 running along the elongated grip 2. A plane (unnumbered) through a surface 25 (FIG. 5) of the longitudinal groove 16 defines the acute angle 24 and sets-off with a surface 20 (FIG. 5) of the widened head of the clamp body 1 a zone 18 which defines a generally trapezoidal slot or opening 21. The trapezoidal slot 21 is partially covered by the assembly plate 11, as is best illustrated in FIG. 1 and a bottom edge (unnumbered) of the assembly plate 11 defines a slot 19 (FIG. 1) for introducing the flexible member 26 into the trapezoidal slot 21, the zone 18 and the slot 16, thus permitting the clamp to be rapidly engaged with and removed from the flexible member 26. In other words, the slot 19 permits the flexible member 26 to be rapidly guided into the zone 18 and the slot 16 for subsequent clamping and unclamping during pushing and/or pulling operations of the flexible member 26. Furthermore, since the surface 20 is above the inclined surface (unnumbered) of the handle 4 paralleling the surface 25, the flexible member 26 can not readily escape from its confined position within the zone 18 and thereby accidentally slip out of the clamp through the slot 19. This assures that the operator is not subject to danger/damage when utilizing the clamp of the present invention.

In further accordance with this invention the widened head or first end portion 3 of the clamp body 1 also includes an arcuate stop surface or abutment means 27 (FIG. 5) for limiting the movement of the handle 4 to its fully opened position, as shown in FIG. 1. Since the curvature of the abutment means or stop surface 27 is different than that of the curved end (unnumbered) of the handle 4 adjacent the screw 9, these surfaces will contact each other when the handle 4 is in the unclamped position shown in FIG. 1 and further opening movement of the handle 4 away from the clamp body 1 is precluded. This assures that the handle 4 is moved between comfortable limits of clamping and unclamping under the influence of the spring 12.

The hand hole or aperture 5 and the bottom of the clamping body 1 may also be provided with undulations (unnumbered) to facilitate the gripping thereof in order to assure that the clamp can not slip from the hand of the user and drop in operation. Furthermore, handling is easier and more rapid because these undulations accommodate the natural physiognomy of a person's/operator's hand. In order to facilitate the manufacture of the clamp, all parts except the spring 12 and the pad 17 are preferably constructed from semi-rigid injection-molded plastic material which also facilitates the formation of the reinforcing beads 6.

Although a preferred embodiment of the invention has been specifically illustrated and described herein, it is to be understood that minor variations may be made in the apparatus without departing from the spirit and scope of the invention, as defined in the appended claims.

I claim:

1. A clamp for gripping a flexible member, such as flexible bars for pulling cables into cable-protective conduits, comprising a clamp body having a generally elongated longitudinal groove adapted to receive therein a portion of a flexible member, said clamp body having opposite end portions, a handle, said handle having opposite end portions, means pivotally connecting first of said handle end portions to a first of said clamp body end portions, said handle having an elongated strip in opposed aligned relationship to and size generally to mate with said longitudinal groove when the second of said handle and clamp body end portions are pivoted from a second position remote from each other to a first position contiguous each other, an assembly plate, means for securing said handle first end portion between said assembly plate and said clamp body first end portion, and said assembly plate includes a surface in generally parallel spaced relationship to a portion of said elongated longitudinal groove adjacent said clamp body first end portion.

2. The clamp as defined in claim 1 including abutment means defined by said clamping body first end portion for stopping pivotal movement of said handle at said second position.

3. The clamp as defined in claim 1 wherein said handle includes a handle aperture having a reinforcing bead on at least two opposite sides thereof.

4. The clamp as defined in claim 1 including a pad of resilient gripping material housed in said longitudinal groove.

5. The clamp as defined in claim 1 including spring means cooperative between said handle and clamp body first end portions for biasingly urging said handle and clamp body second end portions to said second position.

6. The clamp as defined in claim 1 including spring means cooperative between said handle and clamp body first end portions for biasingly urging said handle and clamp body second end portions to said second position, said spring means being a spring having a coil and a pair of legs, and first and second abutment means defined by said handle and clamp body first end portions respectively against which respective first and second legs of said pair of legs bear for biasing said handle and clamp body second end portions to said second position.

7. A clamp for gripping a flexible member, such as flexible bars for pulling cables into cable-protective conduits, comprising a clamp body having a generally elongated longitudinal groove adapted to receive therein a portion of a flexible member, said clamp body having opposite end portions, a handle, said handle having opposite end portions, means pivotally connecting a first of said handle end portions to a first of said clamp body end portions, said handle having an elongated strip in opposed aligned relationship to and sized generally to mate with said longitudinal groove when the second of said handle and clamp body end portions are pivoted from a second position remote from each other to a first position contiguous each other, said elongated longitudinal groove includes a first groove portion at said clamp body first end portion and a second groove portion extending toward and along said clamp body second end portion, and said first and second groove portions lie in respective first and second planes defining an acute angle therebetween.

8. A clamp for gripping a flexible member, such as flexible bars for pulling cables into cable-protective conduits, comprising a clamp body having a generally elongated longitudinal groove adapted to receive therein a portion of a flexible member, said clamp body having opposite end portions, a handle, said handle having opposite end portions, means pivotally connecting a first of said handle end portions to a first of said clamp body end portions, said handle having an elongated strip in opposed aligned relationship to and sized generally to mate with said longitudinal groove when the second of said handle and clamp body end portions are pivoted from a second position remote from each other to a first position contiguous each other, said elongated longitudinal groove includes a first groove portion at said clamp body first end portion and a second groove portion extending toward and along said clamp body second end portion, said first and second groove portions lie in respective first and second planes defining an acute angle therebetween, and said clamp body first end portion includes a surface defining with said first groove portion a generally trapezoidal gap.

9. The clamp as defined in claim 7 including an assembly plate, means for securing said handle first end portion between said assembly plate and said clamp body first end portion, and said assembly plate includes a surface in generally parallel spaced relationship to a portion of said elongated longitudinal groove adjacent said clamp body first end portion.

10. The clamp as defined in claim 8 including an assembly plate, means for securing said handle first end portion between said assembly plate and said clamp body first end portion, and said assembly plate includes a surface in generally parallel spaced relationship to a portion of said elongated longitudinal groove adjacent said clamp body first end portion.

* * * * *